US011151558B2

(12) United States Patent
Ferenczi et al.

(10) Patent No.: US 11,151,558 B2
(45) Date of Patent: Oct. 19, 2021

(54) ZERO-KNOWLEDGE PROOF PAYMENTS USING BLOCKCHAIN

(71) Applicant: American Express Travel Related Services Company, Inc., New York, NY (US)

(72) Inventors: Andras L. Ferenczi, Peoria, AZ (US); Dallas L. Gale, Scottsdale, AZ (US); Nilesh Y. Jadhav, Phoenix, AZ (US); Harish R. Naik, Phoenix, AZ (US)

(73) Assignee: AMERICAN EXPRESS TRAVEL RELATED SERVICES COMPANY, INC, New York, NY (US)

( * ) Notice: Subject to any disclaimer, the term of this patent is extended or adjusted under 35 U.S.C. 154(b) by 320 days.

(21) Appl. No.: 16/217,734

(22) Filed: Dec. 12, 2018

(65) Prior Publication Data

US 2020/0193425 A1  Jun. 18, 2020

(51) Int. Cl.
*G06Q 20/38* (2012.01)
*H04L 9/06* (2006.01)
*H04L 9/32* (2006.01)

(52) U.S. Cl.
CPC ....... *G06Q 20/389* (2013.01); *G06Q 20/3827* (2013.01); *G06Q 20/3829* (2013.01); *H04L 9/0643* (2013.01); *H04L 9/3221* (2013.01); *H04L 2209/38* (2013.01); *H04L 2209/56* (2013.01)

(58) Field of Classification Search
CPC ............. G06Q 20/389; G06Q 20/3827; G06Q 20/3829; H04L 9/0643; H04L 9/3221; H04L 2209/38; H04L 2209/56

USPC .......................................................... 705/71
See application file for complete search history.

(56) References Cited

U.S. PATENT DOCUMENTS

| | | |
|---|---|---|
| 2007/0294183 A1 | 12/2007 | Camenisch et al. |
| 2013/0117087 A1 | 5/2013 | Coppinger |
| 2016/0253663 A1 | 9/2016 | Clark et al. |
| 2016/0292680 A1 | 10/2016 | Wilson, Jr. et al. |
| 2016/0342989 A1 | 11/2016 | Davis |
| 2016/0345978 A1 | 12/2016 | Cruise |
| 2017/0048209 A1 | 2/2017 | Lohe et al. |
| 2017/0091740 A1 | 3/2017 | Enomoto et al. |
| 2017/0109735 A1 | 4/2017 | Sheng et al. |

(Continued)

FOREIGN PATENT DOCUMENTS

WO  WO-2019092552 A1 *  5/2019  ........... H04L 9/0894

OTHER PUBLICATIONS

Espel et al. "Proposal for Protocol on a Quorum Blockchain with Zero Knowledge." In: IACR Cryptology ePrint Archive 2017.

(Continued)

*Primary Examiner* — James D Nigh
(74) *Attorney, Agent, or Firm* — Thomas | Horstemeyer, LLP

(57) ABSTRACT

A zero-knowledge proof purchase system and process using blockchain is disclosed. The system may comprise a customer device, a merchant system, an issuer system, and a blockchain network having a zero-knowledge proof (ZKP) smart contract. The system may implement a zero-knowledge proof algorithm having a key generator function, a proof function, and a validate function. Each function may be configured to perform various tasks in the system to support and enable zero-knowledge proof purchases.

20 Claims, 5 Drawing Sheets

(56) References Cited

U.S. PATENT DOCUMENTS

| | | |
|---|---|---|
| 2017/0132620 A1 | 5/2017 | Miller et al. |
| 2017/0132621 A1* | 5/2017 | Miller .................. G06Q 20/065 |
| 2017/0132626 A1 | 5/2017 | Kennedy |
| 2017/0230189 A1 | 8/2017 | Toll et al. |
| 2017/0232300 A1 | 8/2017 | Tran et al. |
| 2017/0372300 A1 | 12/2017 | Dunlevy et al. |
| 2018/0006826 A1 | 1/2018 | Smith |
| 2018/0075453 A1 | 3/2018 | Durvasula |
| 2018/0331832 A1 | 11/2018 | Pulsifer |
| 2019/0164153 A1* | 5/2019 | Agrawal .................. H04L 9/008 |
| 2019/0251558 A1* | 8/2019 | Liu ........................ H04L 9/3218 |
| 2020/0099518 A1* | 3/2020 | Jacobs ................... G06Q 20/12 |

OTHER PUBLICATIONS

International Search Report and Written Opinion dated Feb. 24, 2020 for PCT Patent Application No. PCT/US2019/065621.
Internatinal Search Report and Written Opinion PCT Serial No. PCT/US2018/059670 dated Jan. 25, 2019.
Non-Final Office Action dated May 13, 2019 in U.S. Appl. No. 15/266,350.
Internatinal Search Report and Written Opinion PCT Serial PCT/US2019/022791dated Jun. 6, 2019.
Restriction Office Action dated Aug. 6, 2019 in U.S. Appl. No. 15/405,123.
Final Office Action dated Sep. 11, 2019 in U.S. Appl. No. 15/266,350.

* cited by examiner

ZERO-KNOWLEDGE PROOF PAYMENTS USING BLOCKCHAIN

FIELD

This disclosure generally relates to a payment system, and more particularly, to zero-knowledge proof payment systems and processes using a distributed ledger.

BACKGROUND

Consumers may desire to initiate transactions with a merchant using various methods. For example, a consumer may initiate a transaction with a merchant in person by visiting a brick and mortar store, online through a merchant's website, or via any other suitable means. To complete the transaction, the consumer may submit sensitive information that may include a transaction account number, the consumer's name, the consumer's contact information, or the like. The merchant may request authorization of the transaction by transmitting the transaction account number, an expiration date, a card verification value (CVV), or the like to an issuer system or payment processor. The issuer system or payment processor may validate the transaction account data, ensure that the consumer has sufficient funds to complete the payment, and transmit back an authorization approval or denial. A technical problem is that the typical transaction process exposes sensitive data, including transaction account data and customer data, across multiple channels that maybe unsecure. By exposing the sensitive data in typical transaction processes, the sensitive may be intercepted or otherwise stolen by a third party.

SUMMARY

Systems, methods, and computer readable mediums (collectively, the "system") for zero-knowledge proof payments using blockchain are disclosed. The system may comprise a zero-knowledge proof (ZKP) smart contract configured to execute a validate function in response to being invoked by a merchant system during a payment process, wherein the merchant system invokes the ZKP smart contract by transmitting a proof, a customer hash, a merchant hash, and a purchase amount to the ZKP smart contract, wherein the validate function is executed by inputting a verification key, the proof, and the customer hash into the validate function, and wherein the validate function is associated with a zero-knowledge proof algorithm; adjust a customer account balance associated with the customer hash in response to the validate function passing, wherein the customer account balance is adjusted based on the purchase amount, and wherein the customer account balance is maintained on a blockchain; adjusting a merchant account balance associated with the merchant hash, wherein the merchant account balance is adjusted based on the purchase amount, and wherein the merchant account balance is maintained on a blockchain; and writing a success notification to the blockchain, wherein the success notification comprises data indicating that the payment process was successfully completed.

In various embodiments, the merchant system may invoke the ZKP smart contract in response to receiving the proof and the customer hash from a customer device. The customer device may generate the proof by executing a proof function associated with the zero-knowledge proof algorithm. The proof function may be executed by inputting a proving key, the customer hash, and a payment hash into the proof algorithm. The customer device may generate the proof in response to initiating the payment purchase with the merchant system. The payment hash may be generated by inputting customer identifying data and a customer nonce into a hashing algorithm.

In various embodiments, the an issuer system may create the zero-knowledge proof algorithm. The zero-knowledge proof algorithm may comprise a key generator function, the proof function, and the validate function. The issuer system may generate the proving key and the verification key by executing the key generator function. The key generator function may be executed by inputting a random number into the key generator function. The issuer system may generate the ZKP smart contract to comprise the validate function.

In various embodiments, the issuer system may generate the merchant hash in response to receiving a merchant registration request from the merchant system. The merchant hash may be generated by inputting merchant identifying data and the merchant nonce into a hashing algorithm. The ZKP smart contract may write the merchant hash and the merchant account balance to the blockchain. In response to the ZKP smart contract completing the write, the issuer system may transmit the merchant hash and the merchant nonce to the merchant system. In various embodiments, the issuer system may generate the customer hash in response to receiving customer registration request from the customer device. The customer hash may be generated by inputting the customer identifying data and the customer nonce into the hashing algorithm. The ZKP smart contract may write the customer hash and the customer account balance to the blockchain. In response to the ZKP smart contract completing the write, the issuer system may transmit the customer hash and the customer nonce to the customer device.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION

The subject matter of the present disclosure is particularly pointed out and distinctly claimed in the concluding portion of the specification. However, a more complete understanding of the present disclosure may be obtained by referring to the detailed description and claims when considered in connection with the drawing figures, wherein like numerals denote like elements.

DETAILED DESCRIPTION

Figure 1:
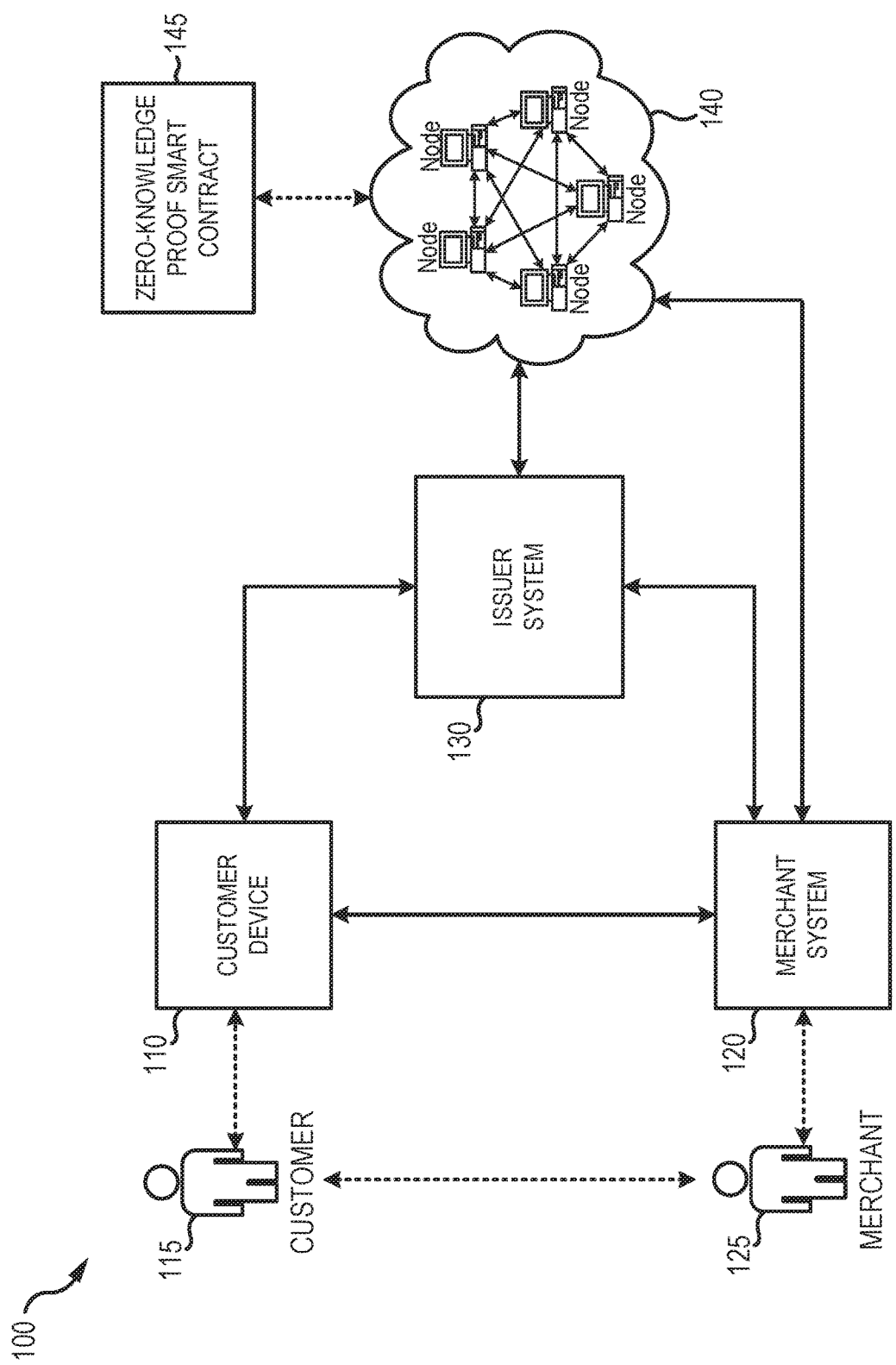
FIG. 1 is an exemplary block diagram illustrating a zero-knowledge proof payment system, in accordance with various embodiments.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used herein, "each" refers to each member of a set or each member of a subset of a set. Furthermore, any reference to singular includes plural embodiments, and any reference to more than one component may include a singular embodiment. Although specific advantages have been enumerated herein, various embodiments may include some, none, or all of the enumerated advantages.

The zero-knowledge proof payment system and process may be used to complete transactions between a customer and a merchant without the customer needing to expose sensitive data, including transaction account data. The system may implement a zero-knowledge proof algorithm such as, for example, zk-SNARKs. The algorithm enables the customer to prove knowledge or possession of certain information (e.g., the transaction account data), and the merchant to verify knowledge or possession of the information, without the actual information needing to be disclosed or exchanged between the parties. An issuer system may establish the zero-knowledge proof algorithm and may allow merchants and customers to register with the issuer system to enroll in zero-knowledge proof payments. Customer account balances, merchant account balances, and transaction data may be maintained on a blockchain. A smart contract may be used to control end-to-end data flow during the zero-knowledge proof payment process, and to update customer account balances and merchant account balances, in response to a successful authorization and/or transaction.

This system further improves the functioning of the computer. For example, by transmitting, storing, and accessing data using the processes described herein, the security of the data is improved, which decreases the risk of the computer, network, and/or sensitive data from being compromised. For example, by using the zero-knowledge proof method provided herein, the personal information of customers is only stored with the issuer system. Since no personal information is shared with merchants, confidential information and credentials including the transaction account number is not exposed during the payment process. Moreover, because the merchant does not receive personal information, merchants may not need to certify for Payment Card Industry Data Security Standard (PCI DSS) compliance.

The systems, methods, and computer readable mediums (collectively, the "system") described herein, in accordance with various embodiments, may use a distributed ledger maintained by a plurality of computing devices (e.g., nodes) over a peer-to-peer network. Each computing device maintains a copy and/or partial copy of the distributed ledger and communicates with one or more other computing devices in the network to validate and write data to the distributed ledger. The distributed ledger may use features and functionality of blockchain technology, including, for example, consensus based validation, immutability, and cryptographically chained blocks of data. The blockchain may comprise a ledger of interconnected blocks containing data. The blockchain may provide enhanced security because each block may hold individual transactions and the results of any blockchain executables. Each block may link to the previous block and may include a timestamp. Blocks may be linked because each block may include the hash of the prior block in the blockchain. The linked blocks form a chain, with only one successor block allowed to link to one other predecessor block for a single chain. Forks may be possible where divergent chains are established from a previously uniform blockchain, though typically only one of the divergent chains will be maintained as the consensus chain. In various embodiments, the blockchain may implement smart contracts that enforce data workflows in a decentralized manner. The system may also include applications deployed on user devices such as, for example, computers, tablets, smartphones, Internet of Things devices ("IoT" devices), etc. The applications may communicate with the blockchain (e.g., directly or via a blockchain node) to transmit and retrieve data. In various embodiments, a governing organization or consortium may control access to data stored on the blockchain. Registration with the managing organization(s) may enable participation in the blockchain network.

Data transfers performed through the system may propagate to the connected peers within the blockchain network within a duration that may be determined by the block creation time of the specific blockchain technology implemented. For example, on an ETHEREUM®-based network, a new data entry may become available within about 13-20 seconds as of the writing. On a HYPERLEDGER® Fabric 1.0 based platform, the duration is driven by the specific consensus algorithm that is chosen, and may be performed within seconds. In that respect, propagation times and the speed of transferring data, initiating purchases, and completing purchases in the system may be improved compared to existing systems, and implementation costs and time to market may also be drastically reduced. The system also offers increased security at least partially due to the immutable nature of data that is stored in the blockchain, reducing the probability of tampering with various data inputs and outputs. Moreover, the system may also offer increased security of buying requests and purchases by performing cryptographic processes on data prior to storing the data on the blockchain. Therefore, by transmitting, storing, and accessing data using the system described herein, the security of the data is improved, which decreases the risk of the computer or network from being compromised.

In various embodiments, the system may also reduce database synchronization errors by providing a common data structure, thus at least partially improving the integrity of stored data. Further, by syncing data with the involved parties in real time (or near real time), the system may improve data integrity, data confidentiality, and data security, which may also improve the speed of the business process. The system also offers increased reliability and fault tolerance over traditional databases (e.g., relational databases, distributed databases, etc.) as each node may operate with a full copy of the stored data, thus at least partially reducing downtime due to localized network outages and hardware failures. The system may also increase the reliability of data transfers in a network environment having reliable and unreliable peers, as each node broadcasts messages to all connected peers, and, as each block comprises a link to a previous block, a node may quickly detect a missing block and propagate a request for the missing block to the other nodes in the blockchain network. For more information on distributed ledgers implementing features and functionalities of blockchain, see U.S. application Ser. No. 15/266,350 titled SYSTEMS AND METHODS FOR BLOCKCHAIN BASED PAYMENT NETWORKS and filed on Sep. 15, 2016, U.S. application Ser. No. 15/682,180 titled SYSTEMS AND METHODS FOR DATA FILE TRANSFER BALANCING AND CONTROL ON BLOCKCHAIN and filed Aug. 21, 2017, U.S. application Ser. No. 15/728,086 titled SYSTEMS AND METHODS FOR LOYALTY POINT DISTRIBUTION and filed Oct. 9, 2017, U.S. application Ser. No. 15/785,843 titled MESSAGING BALANCING AND CONTROL ON BLOCKCHAIN and filed on Oct. 17, 2017, U.S. application Ser. No. 15/785,870 titled API REQUEST AND RESPONSE BALANCING AND CONTROL ON BLOCKCHAIN and filed on Oct. 17, 2017, U.S. application Ser. No. 15/824,450 titled SINGLE SIGN-ON SOLUTION USING BLOCKCHAIN and filed on Nov. 28, 2017, U.S. application Ser. No. 15/824,513 titled TRANSACTION AUTHORIZATION PROCESS USING BLOCKCHAIN and filed on Nov. 28, 2017, U.S. application Ser. No. 15/943,168 titled TRANSACTION PROCESS USING BLOCKCHAIN TOKEN SMART CONTRACTS and filed on Apr. 2, 2018, U.S. application Ser. No. 15/943,271 titled FRAUD MANAGEMENT USING A DISTRIBUTED DATABASE and filed on Apr. 2, 2018, U.S. application Ser. No. 16/012,598 titled BUYER-CENTRIC MARKETPLACE USING BLOCKCHAIN and filed on Jun. 19, 2018, U.S. application Ser. No. 16/051,126 titled SYSTEM AND METHOD FOR TRANSACTION ACCOUNT BASED MICRO-PAYMENTS and filed on Jul. 31, 2018, and U.S. application Ser. No. 16/052,416 titled PROCUREMENT SYSTEM USING BLOCKCHAIN and filed on Aug. 1, 2018, the contents of which are each incorporated by reference in its entirety.

With reference to FIG. 1, a zero-knowledge proof payment system 100 is depicted according to various embodiments. System 100 may include various computing devices, software modules, networks, and data structures in communication with one another. System 100 may also contemplate uses in association with web services, utility computing, pervasive and individualized computing, security and identity solutions, autonomic computing, cloud computing, commodity computing, mobility and wireless solutions, open source, biometrics, grid computing and/or mesh computing. System 100 based on a blockchain, as described herein, may simplify and automate the payment process and related processes by using the blockchain as a distributed and tamper-proof data store. Transparency is very high for various embodiments using a federated or public blockchain since validation is performed, for example, using data stored by a decentralized autonomous organization (DAO) instead of a specific financial institution.

In various embodiments, system 100 may comprise one or more of a customer device 110, a merchant system 120, an issuer system 130, and/or a blockchain network 140. Blockchain network 140 may be in electronic communication with issuer system 130 via one or more blockchain nodes, APIs, or the like, as discussed further herein. Blockchain network 140 may also be accessible by merchant system 120 in response to merchant system 120 invoking a smart contract (e.g., zero-knowledge proof smart contract 145), as discussed further herein. Blockchain network 140 may be a blockchain network or peer-to-peer network that is private, consortium and/or public in nature (e.g., ETHEREUM®, Bitcoin, HYPERLEDGER® Fabric, etc.). Consortium and private networks may offer improved control over the content of the blockchain and public networks may leverage the cumulative computing power of the network to improve security. Blockchain network 140 may comprise various blockchain nodes in electronic communication with each other, as discussed further herein.

Blockchain network 140 may comprise a plurality of blockchain nodes configured to maintain a blockchain and consent to writes to the blockchain. The blockchain may be a distributed ledger that maintains records in a readable manner and that is resistant to tampering. The blockchain may be based on blockchain technologies such as, for example, ETHEREUM®, Open Chain, Chain Open Standard, HYPERLEDGER® Fabric, CORDA CONNECT®, INTEL® Sawtooth, etc. The blockchain may comprise a ledger of interconnected blocks containing data. Each block may link to the previous block and may include a timestamp. When implemented in support of system 100, the blockchain may serve as an immutable log of zero-knowledge proof payments in system 100. The blockchain may be maintained on various blockchain nodes in the form of copies or partial copies of the blockchain, as discussed further herein. Blocks may be written to the blockchain by establishing consensus between the blockchain nodes. For example, consensus may be established based on proof of work, proof of stake, practical byzantine fault tolerance, delegated proof of stake, or other suitable consensus algorithms.

In various embodiments, blockchain network 101 may host and/or implement one or more smart contracts. The smart contracts may control the end-to-end data flow in system 100 and may autonomously govern the payment process by supporting execution and recording of various transaction data. For example, and in accordance with various embodiments, blockchain network 140 may host one or more zero-knowledge proof (ZKP) smart contracts 145. ZKP smart contract 145 may comprise executables that write data to a blockchain in a predetermined format based on predetermined function parameters passed by an API call or the like, as discussed further herein. ZKP smart contract 145 may include a program written in a programming language such as, for example, Solidity, or any other suitable smart contract programming language.

ZKP smart contract 145 may comprise a smart contract configured to provide various zero-knowledge proof functions and capabilities, as discussed further herein. For example, and in accordance with various embodiments, ZKP smart contract 145 may be configured to control the zero-knowledge proof purchase workflow, write data to the blockchain, transmit notifications to one or more entities, and/or the like, as discussed further herein. For example, and as discussed further herein, ZKP smart contract 145 may be configured to receive data from merchant system 120 during a transaction, execute a validate function to validate the identity of the customer transacting with the merchant, adjust customer account balances and merchant account balances maintained on the blockchain based on the transaction, and write and transmit success notifications in response to successfully adjusting account balances, as discussed further herein.

In various embodiments, a customer 115 may desire to purchase one or more goods or services from a merchant 125. For example, customer 115 may go to a brick and mortar store associate with merchant 125 to purchase goods or services. Customer 115 may use a customer device 110 to complete the purchase with merchant 125. Customer device 110 may interact with a merchant system 120 to transmit data for the purchase, as discussed further herein. As a further example, customer 115 may purchase goods or services from merchant 125 online via a web browser, mobile application or the like. In that respect, customer 115 may interact with customer device 110 to complete the purchase. Customer device 110 may electronically communicate with merchant system 120 to retrieve product or service data and to complete the purchase, as discussed further herein.

In various embodiments, customer device 110 may be in electronic communication with merchant system 120 and/or issuer system 130. Customer device 110 may comprise any suitable hardware, software, and/or database or memory components capable of transmitting, receiving, and/or storing data. Customer device 110 may comprise one or more computing devices, such as, for example a computer or processor, or a set of computers and/or processors, although other types of computing units or systems may also be used. For example, customer device 110 may comprise a processor and one or more tangible, non-transitory memories capable of implementing logic. The processor may be configured to implement various logical operations in response to execution of instructions, for example, instructions stored on the non-transitory, tangible, computer-readable medium, as discussed further herein. Customer device 110 may comprise a laptop, tablet, handheld computer, personal digital assistant, cellular phone, smartphone (e.g., IPHONE®, BLACKBERRY®, and/or the like), IoT device, and/or the like. Customer device 110 may comprise an operating system, such as, for example, a WINDOWS® mobile operating system, an ANDROID® operating system, APPLE® IOS®), a BLACKBERRY® operating system, a LINUX® operating system, and the like. Customer device 110 may also comprise software components installed on customer device 110 and configured to allow customer device 110 to access and/or interact with merchant system 120 and/or issuer system 130. For example, customer device 110 may comprise a web browser (e.g., MICROSOFT INTERNET EXPLORER®, GOOGLE CHROME®, etc.), an application, a micro-app or mobile application, or the like, configured to allow customer device 110 to access and interact with merchant system 120 and/or issuer system 130.

In various embodiments, merchant system 120 may be in electronic communication with customer device 110 and/or issuer system 130. In various embodiments, merchant system 120 may also be configured to invoke ZKP smart contract 145, via blockchain network 140, to complete a zero-knowledge proof purchase, as discussed further herein. Merchant system 120 may be associated with one or more merchant 125 brick and mortar stores, online stores, or the like. Merchant system 120 may comprise any suitable combination of hardware, software, and/or database components. For example, merchant system 120 may comprise one or more network environments, servers, computer-based systems, processors, databases, datacenters, and/or the like. Merchant system 120 may include a graphical user interface ("GUI"), software modules, logic engines, various databases, and/or the like, configured to enable customer 115, via customer device 110, access to merchant system 120. In various embodiments, merchant system 120 may be computer based, and may comprise a processor, a tangible non-transitory computer-readable memory, and/or a network interface, along with other suitable system software and hardware components. Instructions stored on the tangible non-transitory memory may allow merchant system 120 to perform various operations, as described herein.

In various embodiments, merchant system 120 may also comprise a point of sale terminal configured as a mechanism to conduct a transaction. For example, the point of sale may comprise a cashier station, a credit and/or debit card reader, an EMV card reader, and/or the like. The point of sale may comprise a near-field communication (NFC) terminal, or any other suitable terminal enabling wireless transmission of data (e.g., BLUETOOTH®, Wi-Fi, etc.). The NFC terminal may allow for the transfer of information from a NFC enabling user device, such as, for example, customer device 110.

In various embodiments, issuer system 130 may be in electronic communication with customer device 110, merchant system 120, and/or blockchain network 140. Issuer system 130 may comprise any suitable combination of hardware, software, and/or database components. For example, issuer system 130 may comprise one or more network environments, servers, computer-based systems, processors, databases, and/or the like. Issuer system 130 may comprise at least one computing device in the form of a computer or processor, or a set of computers/processors, although other types of computing units or systems may be used, such as, for example, a server, web server, pooled servers, or the like. Issuer system 130 may also include one or more data centers, cloud storages, or the like, and may include software, such as APIs, configured to perform various operations discussed herein. Issuer system 130 may also include one or more blockchain nodes, application programming interfaces (APIs), software development kits (SDKs), or the like configured to allow issuer system 130 to interact with blockchain network 140, retrieve and write data to the blockchain, and deploy one or more ZKP smart contracts 145. In various embodiments, issuer system 130 may include one or more processors and/or one or more tangible, non-transitory memories and be capable of implementing logic. The processor may be configured to implement various logical operations in response to execution of instructions, for example, instructions stored on a non-transitory, tangible, computer-readable medium, as discussed further herein.

In various embodiments, issuer system 130 comprise or interact with a traditional payment network or transaction network to facilitate purchases and payments, authorize transactions, settle transactions, and the like. For example, issuer system 130 may represent existing proprietary networks that presently accommodate transactions for credit cards, debit cards, and/or other types of transaction accounts or transaction instruments. Issuer system 130 may be a closed network that is secure from eavesdroppers. In various embodiments, issuer system 130 may comprise an exemplary transaction network such as AMERICAN EXPRESS®, VISANET®, MASTERCARD®, DISCOVER®, INTERAC®, Cartes Bancaires, JCB®, private networks (e.g., department store networks), and/or any other payment network, transaction network, issuer system, or the like. Issuer system 130 may include systems and databases related to financial and/or transactional systems and processes, such as, for example, one or more authorization engines, authentication engines and databases, settlement engines and databases, accounts receivable systems and databases, accounts payable systems and databases, and/or the like. In various embodiments, issuer system 130 may also comprise a transaction account issuer's Credit Authorization System ("CAS") capable of authorizing transactions, as discussed further herein. Issuer system 130 may be configured to authorize and settle transactions, and maintain transaction account member databases, accounts receivable databases, accounts payable databases, or the like.

Although the present disclosure makes reference to issuer system 130, it should be understood that principles of the present disclosure may be applied to a zero-knowledge proof payment system having any suitable number of issuer systems. For example, system 100 may comprise one or more issuer systems 130 each corresponding to or associated with a different issuer system or network. In various embodiments, each issuer system may also comprise or interact with an associated blockchain network.

As used herein, "transmit" may include sending at least a portion of electronic data from one system 100 component to another. Additionally, as used herein, "data," "information," or the like may include encompassing information such as commands, queries, files, messages, data for storage, and the like in digital or any other form.

As used herein, "electronic communication" may comprise a physical coupling and/or non-physical coupling capable of enabling system 100 components to transmit and receive data. For example, "electronic communication" may refer to a wired or wireless protocol such as a CAN bus protocol, an Ethernet physical layer protocol (e.g., those using 10BASE-T, 100BASE-T, 1000BASE-T, etc.), an IEEE 1394 interface (e.g., FireWire), Integrated Services for Digital Network (ISDN), a digital subscriber line (DSL), an 802.11a/b/g/n/ac signal (e.g., Wi-Fi), a wireless communications protocol using short wavelength UHF radio waves and defined at least in part by IEEE 802.15.1 (e.g., the BLUETOOTH® protocol maintained by Bluetooth Special Interest Group), a wireless communications protocol defined at least in part by IEEE 802.15.4 (e.g., the ZIGBEE® protocol maintained by the ZigBee alliance), a cellular protocol, an infrared protocol, an optical protocol, or any other protocol capable of transmitting information via a wired or wireless connection.

One or more of the system 100 components may be in electronic communication via a network. As used herein, the term "network" may further include any cloud, cloud computing system, or electronic communications system or method that incorporates hardware and/or software components. Communication amongst the nodes may be accomplished through any suitable communication channels, such as, for example, a telephone network, an extranet, an intranet, Internet, point of interaction device (personal digital assistant, cellular phone, kiosk, tablet, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using Internetwork Packet Exchange (IPX), APPLETALK® program, IP-6, NetBIOS, OSI, any tunneling protocol (e.g., IPsec, SSH, etc.), or any number of existing or future protocols. If the network is in the nature of a public network, such as the internet, it may be advantageous to presume the network to be insecure and open to eavesdroppers. Specific information related to the protocols, standards, and application software utilized in connection with the Internet is generally known to those skilled in the art and, as such, need not be detailed herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing.

The various system components may be independently, separately or collectively suitably coupled to the network via data links which includes, for example, a connection to an Internet Service Provider (ISP) over the local loop as is typically used in connection with standard modem communication, cable modem, DISH NETWORKS®, ISDN, DSL, or various wireless communication methods. It is noted that the network may be implemented as other types of networks, such as an interactive television (ITV) network. Moreover, the system contemplates the use, sale or distribution of any goods, services or information over any network having similar functionality described herein.

A network may be unsecure. Thus, communication over the network may utilize data encryption. Encryption may be performed by way of any of the techniques now available in the art or which may become available—e.g., Twofish, RSA, El Gamal, Schorr signature, DSA, PGP, PKI, GPG (GnuPG), HPE Format-Preserving Encryption (FPE), Voltage, Triple DES, Blowfish, AES, MD5, HMAC, IDEA, RC6, and symmetric and asymmetric cryptosystems. Network communications may also incorporate SHA series cryptographic methods, elliptic-curve cryptography (e.g., ECC, ECDH, ECDSA, etc.), and/or other post-quantum cryptography algorithms under development.

For the sake of brevity, conventional data networking, application development, and other functional aspects of system 100 may not be described in detail herein. Furthermore, the connecting lines shown in the various figures contained herein are intended to represent exemplary functional relationships and/or electronic communications between the various elements. It should be noted that many alternative or additional functional relationships or electronic communications may be present in a practical system.

Referring now to FIGS. 2-5 the process flows and screenshots depicted are merely embodiments and are not intended to limit the scope of the disclosure. For example, the steps recited in any of the method or process descriptions may be executed in any order and are not limited to the order presented. It will be appreciated that the following description makes appropriate references not only to the steps and user interface elements depicted in FIGS. 2-5, but also to the various system components as described above with reference to FIG. 1. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below. Unless otherwise specifically noted, articles depicted in the drawings are not necessarily drawn to scale.

Figure 2:
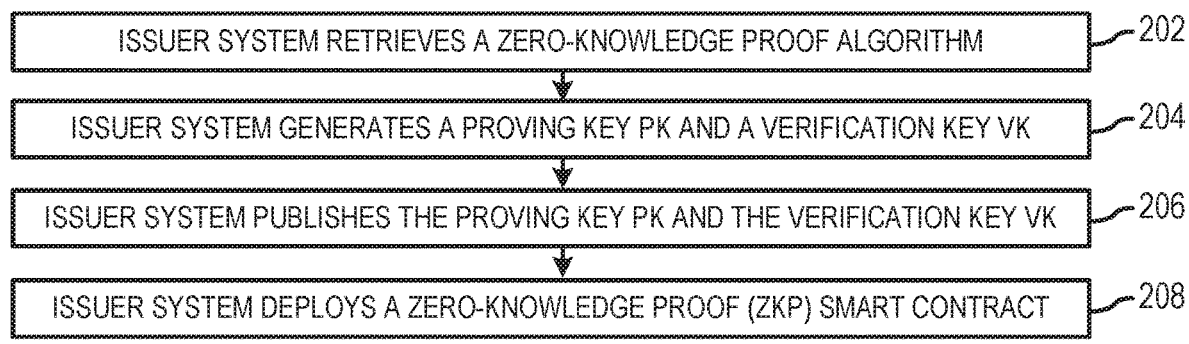
FIG. 2 illustrates an exemplary process flow for initializing a zero-knowledge proof algorithm, in accordance with various embodiments.

With specific reference to FIG. 2, a process 201 for initializing a zero-knowledge proof algorithm is disclosed, in accordance with various embodiments. Issuer system 130 may initialize the zero-knowledge proof algorithm to allow customers and merchants to participate in zero-knowledge proof payments.

Issuer system 130 retrieves a zero-knowledge proof algorithm (Step 202). The zero-knowledge proof algorithm may comprise any suitable algorithm enabling merchants to confirm that customers are in possession of their personal information (e.g., transaction account data, customer data, etc.) without needing each customer to provide any personal information during transactions. For example, the zero-knowledge proof algorithm may be zk-SNARKs, or any other similar zero-knowledge proof algorithm. The zero-knowledge proof algorithm may comprise one or more functions, programs, or algorithms such as, for example, a key generator function, a proof function, and a validate function. The key generating function may be configured to generate a proving key pk and a verification key vk, as discussed further herein. The proof function may be configured to generate a proof (e.g., a proof blob), as discussed further herein. The validate function may be configured to validate that the proof to authorize the customer during the zero-knowledge proof payment process, as discussed further herein. The various functions may be programmed using JAVASCRIPT®, or any other suitable programming language.

Issuer system 130 generates a proving key pk and a verification key vk (Step 204) using the key generator function from the zero-knowledge proof algorithm. For example, issuer system 130 may generate a random number (e.g., a secret parameter lambda) and input the random number into the key generator function to generate the proving key pk and the verification key vk. In various embodiments, in response to successfully generating the keys, issuer system 130 may delete the random number to increase security of the generated keys. In various embodiments, issuer system 130 may generate different keys based on different payment types (e.g., credit card, debit card, gift card, loyalty points, a third party payment provider, etc.). Issuer system 130 publishes the proving key pk and the verification key vk (Step 206). In various embodiments, issuer system 130 may publish the keys by making the keys available on a publicly-accessible web server, website, or the like. In various embodiments, issuer system 130 may publish the keys by transmitting the keys to merchants and users registered for zero-knowledge proof payments (e.g., transmitting the verification key vk to merchant system 120 and the proving key pk to customer device 110). In various embodiments, issuer system 130 may generate new keys at any desired interval to increase the security of the keys during the zero-knowledge proof payment process (e.g., weekly, monthly, etc.).

Issuer system 130 deploys a zero-knowledge proof (ZKP) smart contract 145 (Step 208) to blockchain network 140. ZKP smart contract 145 may be generated by issuer system 130 to comprise the validate function from the zero-knowledge proof algorithm. Issuer system 130 (via a blockchain node, API, or the like) may deploy ZKP smart contract 145 to blockchain network 140 by propagating a blockchain write to at least a second blockchain node in blockchain network 140. The blockchain nodes may consent to the write using any suitable technique and consensus algorithm.

Figure 3:
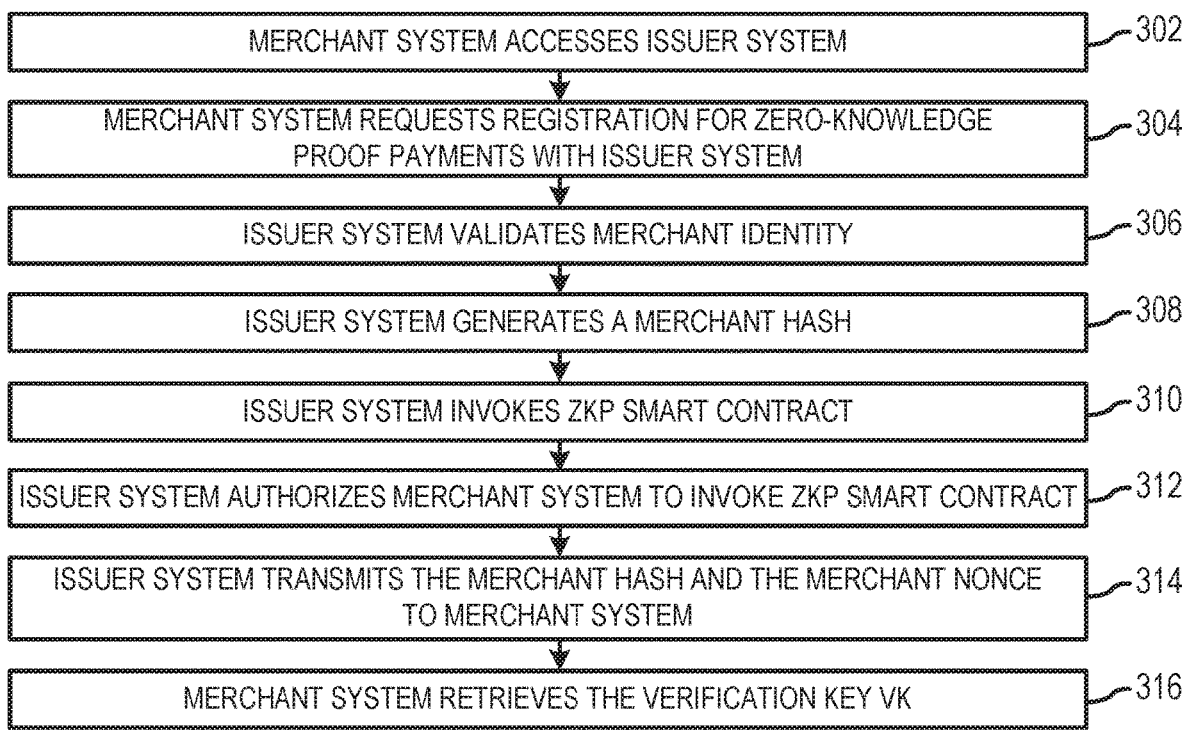
FIG. 3 illustrates an exemplary process flow for merchant registration for zero-knowledge proof payments, in accordance with various embodiments.

With specific reference to FIG. 3, a process 301 for merchant registration for zero-knowledge proof payments is disclosed, in accordance with various embodiments. Merchant system 120 accesses issuer system 130 (Step 302) via a web browser, mobile application, or the like. Access to issuer system 130 may be controlled using any suitable access control, such as, for example, merchant credentials (e.g., username or merchant identifier, password, biometric input, etc.). In various embodiments, merchant system 120 may also access issuer system 130 as part of an initial merchant registration, and may receive the merchant credentials for future access. Merchant system 120 requests registration for zero-knowledge proof payments with issuer system 130 (Step 304). Issuer system 130 validates merchant 125 identity (Step 306). For example, merchant system 120 may be prompted to provide merchant identifying information such as a merchant ID, a merchant address, a merchant name, or the like. Issuer system 130 may validate merchant 125 identity by comparing the provided merchant identify information against stored merchant data.

In various embodiments, issuer system 130 generates a merchant hash (Step 308). The merchant hash may be generated to function as a unique identifier of merchant 125 (and merchant system 120). Issuer system 130 may generate the merchant hash based on one or more merchant data elements. For example, the merchant hash may comprise a one-way cryptographic hash of one or more of a merchant business name, a merchant owner name, a merchant ID, a merchant nonce, or the like. The merchant nonce may comprise one or more alphanumeric characters and may be randomly generated to be unique to the merchant 125 (e.g., a cryptographic nonce comprising various arbitrary alphanumeric characters, such as "c9La5"). Issuer system 130 may generate the merchant hash using any suitable hashing algorithm, such as an encryption algorithm from the SHA-2 series of cryptographic methods (e.g., SHA 256, SHA 512, etc.), or the like. Issuer system 130 may also generate the merchant hash using a key stretching technique and or any other technique to increase the security of the merchant hash from brute force attacks, rainbow table attacks, or the like. In various embodiments, the merchant hash may also be generated to comprise a randomly generated string, a blockchain address, and/or any other suitable unique identifier.

In various embodiments, issuer system 130 invokes ZKP smart contract 145 (Step 310) by passing the merchant hash to ZKP smart contract 145. In response to being invoked, ZKP smart contract 145 writes the merchant hash to the blockchain, and associates the merchant hash with a merchant account balance entry on the blockchain. ZKP smart contract 145 may propagate the blockchain write to at least a second blockchain node in blockchain network 140. The blockchain nodes may consent to the write using any suitable technique and consensus algorithm. In response to completing the blockchain write, ZKP smart contract 145 may return a write notification to issuer system 130.

Issuer system 130 authorizes merchant system 120 to invoke ZKP smart contract 145 (Step 312). For example, wherein the blockchain is a permissioned blockchain, issuer system 130 may add merchant system 120 to the permissioned blockchain network. In various embodiments, issuer system may add a unique identifier and/or digital certificate to the blockchain configuration to designate that merchant system 120 is authorized to invoke ZKP smart contract 145. In that regard, invocation of ZKP smart contract 145 by a merchant system may comprise the signature of the particular merchant system. Issuer system 130 transmits the merchant hash and the merchant nonce to merchant system 120 (Step 314). Merchant system 120 may store the merchant hash and the merchant nonce in a secure local repository. Merchant system 120 retrieves the verification key vk (Step 316). In various embodiments, merchant system 120 may retrieve the verification key vk from issuer system 130 during the zero-knowledge proof payment registration process. In various embodiments, issuer system 130 may also transmit the verification key vk to merchant system 120 together with the merchant hash and the merchant nonce.

Figure 4:
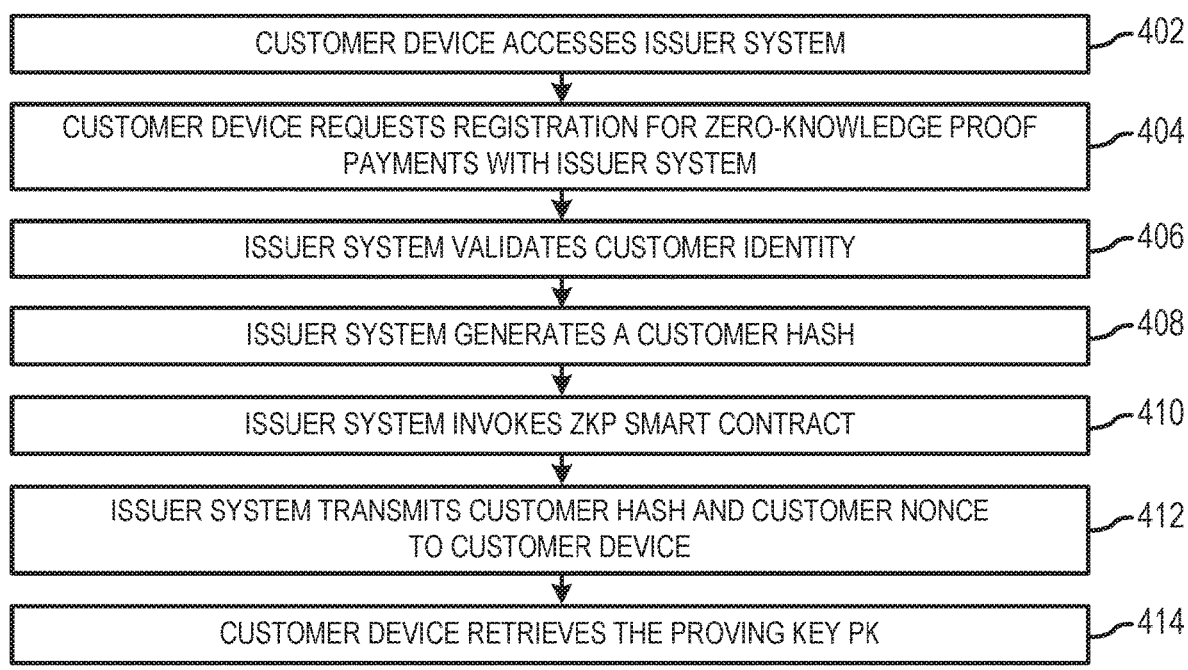
FIG. 4 illustrates an exemplary process flow for customer registration for zero-knowledge proof payments, in accordance with various embodiments.

With specific reference to FIG. 4, a process 401 for customer registration for zero-knowledge proof payments is disclosed, in accordance with various embodiments. Customer device 110 accesses issuer system 130 (Step 402) via a web browser, mobile application, or the like. Access to issuer system 130 may be controlled using any suitable access control, such as, for example, customer credentials (e.g., username, password, biometric input, etc.). In various embodiments, customer device 110 may also access issuer system 130 as part of an initial customer registration (e.g., registration on the website, application for a transaction account, etc.), and may receive the customer credentials for future access. Customer device 110 requests registration for zero-knowledge proof payments with issuer system 130 (Step 404). In various embodiments, the registration request may comprise the account (e.g., transaction account, gift card, loyalty point account, cryptocurrency account, etc.) customer 115 desires to use for zero-knowledge proof payments. The registration request may also comprise an account balance of the account that customer 115 desires to have available to use for zero-knowledge proof payments.

Issuer system 130 validates customer 115 identity (Step 406). For example, customer device 110 may be prompted to provide customer identifying information such as a customer name, a customer address, a transaction account number, a transaction account expiration data, a transaction account card verification value (CVV), or the like. Issuer system 130 may validate customer 115 identity by comparing the provided customer identify information against stored customer data.

In various embodiments, issuer system 130 generates a customer hash (Step 408). The customer hash may be generated to function as a unique identifier of customer 115 (and/or customer device 10). Issuer system 130 may generate the customer hash based on one or more customer data elements. For example, the customer hash may comprise a one-way cryptographic hash of one or more of the customer name, the customer address, the transaction account number, a customer nonce, or the like. The customer nonce may comprise one or more alphanumeric characters and may be randomly generated to be unique to the customer 115 (e.g., a cryptographic nonce comprising various arbitrary alphanumeric characters, such as "a8Kn4"). Issuer system 130 may generate the customer hash using any suitable hashing algorithm, such as an encryption algorithm from the SHA-2 series of cryptographic methods (e.g., SHA 256, SHA 512, etc.), or the like. Issuer system 130 may also generate the customer hash using a key stretching technique and or any other technique to increase the security of the customer hash from brute force attacks, rainbow table attacks, or the like. In various embodiments, the customer hash may also be generated to comprise a randomly generated string, a blockchain address, and/or any other suitable unique identifier.

Issuer system 130 invokes ZKP smart contract 145 (Step 410) by passing the customer hash to ZKP smart contract 145. In various embodiments, issuer system 130 may also pass the account balance defined by customer 115 in the registration request. In response to being invoked, ZKP smart contract 145 writes the customer hash to the blockchain, and associates the customer hash with a customer account balance entry on the blockchain. The customer account balance may be defined by the account balance defined by customer 115 in the registration request. ZKP smart contract 145 may propagate the blockchain write to at least a second blockchain node in blockchain network 140. The blockchain nodes may consent to the write using any suitable technique and consensus algorithm. In response to completing the blockchain write, ZKP smart contract 145 may return a write notification to issuer system 130.

Issuer system 130 transmits the customer hash and the customer nonce to customer device 110 (Step 412). Customer device 110 may store the customer hash and the customer nonce locally in a secure device repository. Customer device 110 retrieves the proving key pk (Step 414) from the location deployed to by issuer system 130. For example, and in accordance with various embodiments, the proving key pk may be integrated into a mobile application, website, or the like used by customer 115 to purchase goods or services from merchant 125. In various embodiments, issuer system 130 may also transmit the proof function to customer device 110, and/or enable software in customer device 110 to execute the proof function during the zero-knowledge proof payment process. In various embodiments, customer device 110 may download and/or install a native application, or may use a browser-based application, configured to execute the proof function during the zero-knowledge proof payment process.

Figure 5:
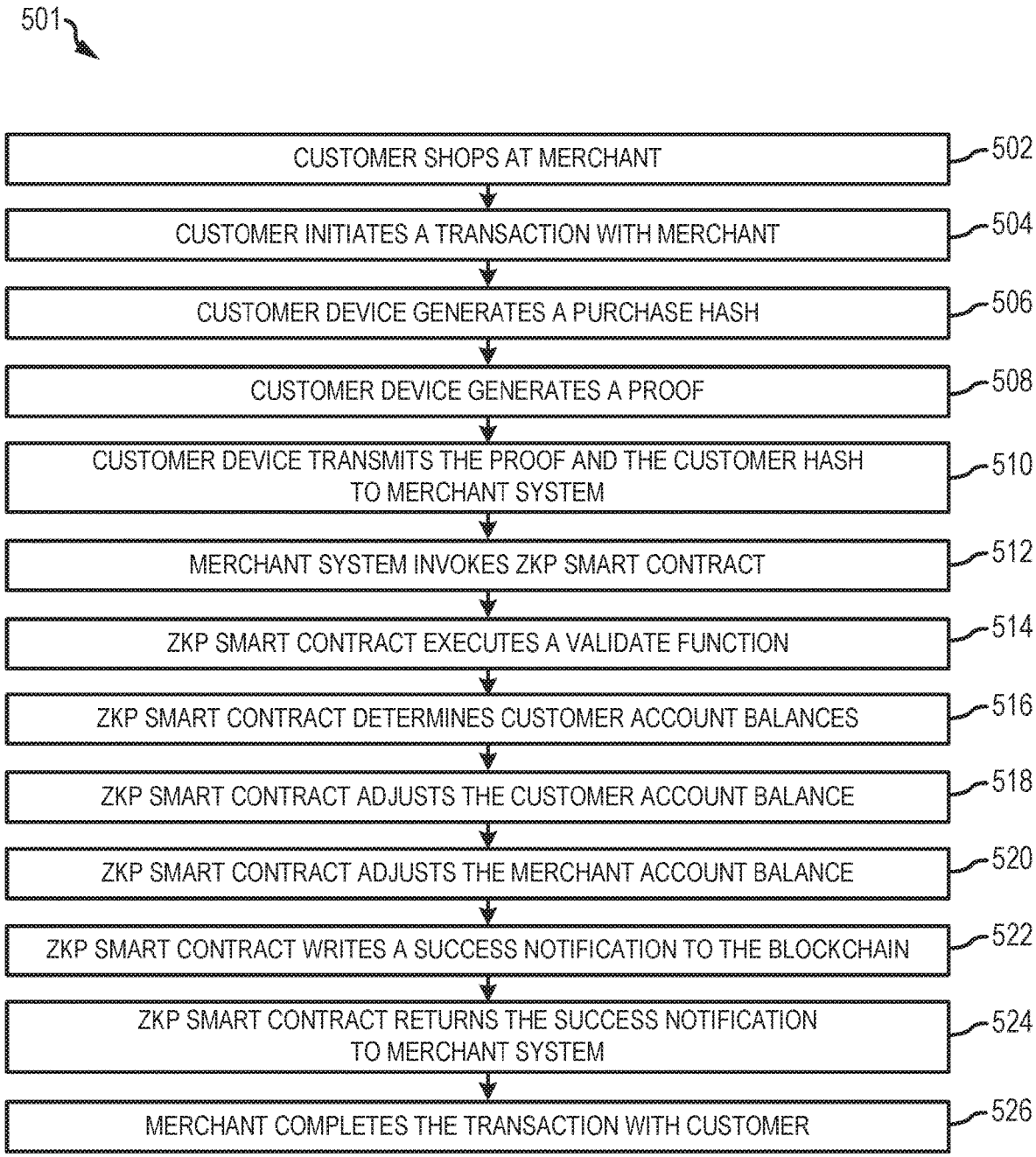
FIG. 5 illustrates an exemplary process flow for a zero-knowledge proof payment process, in accordance with various embodiments.

With specific reference to FIG. 5, a process 501 for a zero-knowledge proof payment is disclosed, in accordance with various embodiments. Customer 115 shops at merchant 125 (Step 502). For example, customer 115 may shop at merchant 125 by visiting a brick and mortar store associated with merchant 125, by visiting an online store via customer device 110, or the like. In response to customer 115 desiring to purchase one or more goods and/or services, customer 115 initiates a transaction with merchant 125 (Step 504). For example, merchant 125 (and/or merchant system 120) may prompt customer 115 (and/or customer device 110) to select a payment method. Customer 115 may select a zero-knowledge proof payment method to initiate the transaction.

In various embodiments, customer device 110 generates a purchase hash (Step 506). The purchase hash may comprise a one-way cryptographic hash of one or more of the customer name, the customer address, the transaction account number, the customer nonce, or the like. Customer device 110 may generate the customer hash using any suitable hashing algorithm, such as an encryption algorithm from the SHA-2 series of cryptographic methods (e.g., SHA 256, SHA 512, etc.), or the like. Customer device 110 may also generate the customer hash using a key stretching technique and or any other technique to increase the security of the customer hash from brute force attacks, rainbow table attacks, or the like.

Customer device 110 generates a proof (Step 508) using the proof function from the zero-knowledge proof algorithm. The proof may be generated to comprise a binary large object (BLOB) file. Customer device 110 may input the proving key pk, the customer hash, and the purchase hash into the proof function to generate the proof. Customer device 110 transmits the proof and the customer hash to merchant system 120 (Step 510).

In response to receiving the proof and the customer hash, merchant system 120 invokes ZKP smart contract 145 (Step 512) by passing the proof, the customer hash, the purchase amount, the verification key vk, and the merchant hash. In response to being invoked, ZKP smart contract 145 executes the validate function (Step 514) from the zero-knowledge proof algorithm. ZKP smart contract 145 may execute the validate function by inputting the verification key vk, the customer hash, and the proof. In response to being executed, the validate function may return a Boolean value indicating whether the validation passed. For example, a Boolean value of 1 (e.g., "true") indicates that the validation passed, and a Boolean value of 0 (e.g., "false") indicates that the validation failed. In various embodiments, merchant system 120 may be configured to execute the validate function, and may transmit the validate function result to ZKP smart contract 145. In response to the validation failing, ZKP smart contract 145 may return a validation failed notification to merchant system 120. In response to the validation passing, ZKP smart contract 145 may proceed with processing the payment.

For example, and in accordance with various embodiments, ZKP smart contract 145 determines the account balance of customer 115 (Step 516). For example, ZKP smart contract 145 may query the blockchain based on the customer hash to determine the customer account balance associated with the customer hash. ZKP smart contract 145 may compare the customer account balance with the purchase amount to determine whether customer 115 has sufficient funds to complete the zero-knowledge proof transaction. In response to determining that customer 115 has insufficient funds to complete the purchase, ZKP smart contract 145 may return an insufficient funds notification to merchant system 120. In response to determining that customer 115 has sufficient funds to complete the purchase, ZKP smart contract 145 adjusts the account balance of customer 115 (Step 518) based on the purchase amount. For example, ZKP smart contract 145 may adjust the customer account balance by decreasing the account balance by an amount equal to the purchase amount. ZKP smart contract 145 adjusts the account balance of merchant 125 (Step 520) based on the purchase amount. ZKP smart contract 145 may query the blockchain based on the merchant hash to locate the merchant account balance associated with the merchant hash. ZKP smart contract 145 may adjust the merchant account balance by increasing the account balance by the purchase amount, minus any applicable transaction fees.

In various embodiments, ZKP smart contract 145 writes a success notification to the blockchain (Step 522) in response to successfully adjusted the account balance of customer 115 and merchant 125. ZKP smart contract 145 may propagate the blockchain write to at least a second blockchain node in blockchain network 140. The blockchain nodes may consent to the write using any suitable technique and consensus algorithm. In response to completing the blockchain write, ZKP smart contract 145 returns the success notification to merchant system 120 (Step 524). In response to receiving the success notification, merchant 125 completes the transaction with customer 115 (Step 526). For example, merchant 125 may complete the transaction by providing the goods and/or services to customer 115.

In various embodiments, payment to merchant 125 based on the completed zero-knowledge proof payment process may be completed by issuer system 130 at any suitable time after process completion (e.g., in real time, near real time, in a batch process, etc.). For example, issuer system 130 may determine the merchant account balance (e.g., by querying the blockchain based on the merchant hash) and may transmit funds equal to the merchant account balance to merchant 125, in accordance with typical settlement processes.

Systems, methods and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "satisfy," "meet," "match," "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward points, discount) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input, and/or any other method known in the art.

Phrases and terms similar to an "item" may include any good, service, information, experience, entertainment, data, offer, discount, rebate, points, virtual currency, content, access, rental, lease, contribution, account, credit, debit, benefit, right, reward, points, coupons, credits, monetary equivalent, anything of value, something of minimal or no value, monetary value, non-monetary value and/or the like. Moreover, the "transactions" or "purchases" discussed herein may be associated with an item. Furthermore, a "reward" may be an item.

The phrases "customer," "user," "transaction account holder," "transaction account beneficiary," "transaction account affiliate," "consumer," "customer," "cardmember," or the like shall include any person, entity, business, government organization, business, software, hardware, or machine associated with a transaction account, who buys merchant offerings offered by one or more merchants using the transaction account, and/or who is legally designated for performing transactions on the transaction account, regardless of whether a physical card is associated with the transaction account. For example, the user may include a transaction account owner, a transaction account user, an account affiliate, a child account user, a subsidiary account user, a beneficiary of an account, a custodian of an account, and/or any other person or entity affiliated or associated with the transaction account.

Phrases and terms similar to "transaction account," "account number," "account code", or "consumer account" as used herein, may include any device, code (e.g., one or more of an authorization/access code, personal identification number ("PIN"), internet code, other identification code, and/or the like), number, letter, symbol, digital certificate, smart chip, digital signal, analog signal, biometric, or other identifier/indicia suitably configured to allow the consumer to access, interact with or communicate with the system. The transaction account number may optionally be located on or associated with a rewards account, charge account, credit account, debit account, prepaid account, telephone card, embossed card, smart card, magnetic stripe card, bar code card, transponder, radio frequency card, or an associated account.

The transaction account number may be distributed and stored in any form of plastic, electronic, magnetic, radio frequency, wireless, audio, and/or optical device capable of transmitting or downloading data from itself to a second device. The transaction account number may be, for example, a sixteen-digit account number, although each transaction account issuer has its own numbering system, such as the fifteen-digit numbering system used by the AMERICAN EXPRESS® company. In that respect, each of the transaction account issuer's transaction account numbers may comply with that transaction account issuer's standardized format, such that the transaction account issuer using a fifteen-digit format will generally use three-spaced sets of numbers, as represented by the number "0000 000000 00000." The first five to seven digits may be reserved for processing purposes and identify the transaction account issuer, account type, etc. In this example, the last (fifteenth) digit is used as a sum check for the fifteen digit number, and the intermediary eight-to-eleven digits are used to uniquely identify the user. A merchant identifier may be, for example, any number or alpha-numeric characters that identify a particular merchant for purposes of account acceptance, account reconciliation, reporting, or the like.

Phrases and terms similar to "financial institution," "issuer system," or "transaction account issuer" may include any entity that offers transaction account services. Although often referred to as a "financial institution," the financial institution may represent any type of bank, lender, or other type of account issuing institution, such as credit card companies, card sponsoring companies, or third party issuers under contract with financial institutions. It is further noted that other participants may be involved in some phases of the transaction, such as an intermediary settlement institution.

Phrases and terms similar to "merchant," "business," "seller," or "supplier" may be used interchangeably with each other and shall mean any person, entity, distributor system, software, and/or hardware that is a provider, broker, and/or any other entity in the distribution chain of goods or services. For example, a merchant may be a grocery store, a retail store, a travel agency, a service provider, an on-line merchant, or the like. The merchant may request payment for goods or services sold to the user who holds a transaction account with a transaction account issuer.

In various embodiments, customer device 110 may integrate with one or more smart digital assistant technologies. For example, exemplary smart digital assistant technologies may include the ALEXA® system developed by the AMAZON® company, the GOOGLE HOME® system developed by Alphabet, Inc., the HOMEPOD® system of the APPLE® company, and/or similar digital assistant technologies. The ALEXA® system, GOOGLE HOME® system, and HOMEPOD® system, may each provide cloud-based voice activation services that can assist with tasks, entertainment, general information, and more. All the ALEXA® devices, such as the AMAZON ECHO®, AMAZON ECHO DOT®, AMAZON TAP®, and AMAZON FIRE® TV, have access to the ALEXA® system. The ALEXA® system, GOOGLE HOME® system, and HOMEPOD® system may receive voice commands via its voice activation technology, activate other functions, control smart devices, and/or gather information. For example, the smart digital assistant technologies may be used to interact with music, emails, texts, phone calls, question answering, home improvement information, smart home communication/activation, games, shopping, making to-do lists, setting alarms, streaming podcasts, playing audiobooks, and providing weather, traffic, and other real time information, such as news. The ALEXA®, GOOGLE HOME®, and HOMEPOD® systems may also allow the user to access information about eligible transaction accounts linked to an online account across all digital assistant-enabled devices.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website or device (e.g., Facebook, YOUTUBE®, APPLE®TV®, PANDORA®, XBOX®, SONY® PLAYSTATION®), a uniform resource locator ("URL"), a document (e.g., a MICROSOFT® Word® document, a MICROSOFT® Excel® document, an ADOBE® .pdf document, etc.), an "ebook," an "emagazine," an application or microapplication (as described herein), an SMS or other type of text message, an email, a FACEBOOK® message, a TWITTER® tweet, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations or any of the operations may be conducted or enhanced by Artificial Intelligence (AI) or Machine Learning. Useful machines for performing the various embodiments include general purpose digital computers or similar devices.

In fact, and in accordance with various embodiments, the embodiments are directed toward one or more computer systems capable of carrying out the functionality described herein. The computer system includes one or more processors. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory or in-memory (non-spinning) hard drives. The secondary memory may include, for example, a hard disk drive and/or a removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data files transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEBSPHERE®, WEBLOGIC®, JBOSS®, EDB® POSTGRES PLUS ADVANCED SERVER® (PPAS), etc.). In various embodiments, the server may include web servers (e.g. APACHE®, IIS, GWS, SUN JAVA® SYSTEM WEB SERVER, JAVA® Virtual Machine running on LINUX® or WINDOWS®).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MACBOOKS®, kiosks, terminals, point of sale (POS) devices and/or terminals, televisions, or any other device capable of receiving data over a network. A web-client may run MICROSOFT® INTERNET EXPLORER®, MOZILLA® FIREFOX®, GOOGLE® CHROME®, APPLE® Safari, or any other of the myriad software packages available for browsing the internet.

As those skilled in the art will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package.

As those skilled in the art will appreciate, a web client includes an operating system (e.g., WINDOWS® OS, OS2, UNIX® OS, LINUX® OS, SOLARIS®, MacOS, and/or the like) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® operating system, APPLE® IOS®, a BLACKBERRY® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein an "identifier" may be any suitable identifier that uniquely identifies an item. For example, the identifier may be a globally unique identifier ("GUID"). The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16 bit integers Any databases discussed herein may include relational, hierarchical, graphical, blockchain, or object-oriented structure and/or any other database configurations. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2 by IBM® (Armonk, N.Y.), various database products available from ORACLE® Corporation (Redwood Shores, Calif.), MICROSOFT ACCESS® or MICROSOFT SQL SERVER® by MICROSOFT® Corporation (Redmond, Wash.), MySQL by MySQL AB (Uppsala, Sweden), MONGODB®, REDIS®, APACHE CASSANDRA®, HBase by APACHE®, MapR-DB, or any other suitable database product. Moreover, the databases may be organized in any suitable manner, for example, as data tables or lookup tables. Each record may be a single file, a series of files, a linked series of data fields or any other data structure.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set: e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the user at the standalone device, the appropriate option for the action to be taken. The system may contemplate a data storage arrangement wherein the header or trailer, or header or trailer history, of the data is stored on the system, device, or transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, GPG (GnuPG), HPE Format-Preserving Encryption (FPE), Voltage, and symmetric and asymmetric cryptosystems. The systems and methods may also incorporate SHA series cryptographic methods as well as ECC (Elliptic Curve Cryptography) and other Quantum Readable Cryptography Algorithms under development.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within a web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the MICROSOFT® INTERNET INFORMATION SERVICES® (IIS), MICROSOFT® Transaction Server (MTS), and MICROSOFT® SQL Server, are used in conjunction with the MICROSOFT® operating system, MICROSOFT® NT web server software, a MICROSOFT® SQL Server database system, and a MICROSOFT® Commerce Server. Additionally, components such as Access or MICROSOFT® SQL Server, ORACLE®, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, Ruby, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT®, active server pages (ASP), common gateway interface scripts (CGI), extensible markup language (XML), dynamic HTML, cascading style sheets (CSS), AJAX (Asynchronous JAVASCRIPT® And XML), helper applications, plug-ins, and the like. A server may include a web service that receives a request from a web server, the request including a URL and an IP address (e.g., 10.0.0.2). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. For example, representational state transfer (REST), or RESTful, web services may provide one way of enabling interoperability between applications.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WEBSPHERE® MQ™ (formerly MQSeries) by IBM®, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, popup window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT, JAVASCRIPT Object Notation (JSON), VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. Cryptography and network security methods are well known in the art, and are covered in many standard texts.

In various embodiments, the software elements of the system may also be implemented using Node.js®. Node.js® may implement several modules to handle various core functionalities. For example, a package management module, such as Npm®, may be implemented as an open source library to aid in organizing the installation and management of third-party Node.js® programs. Node.js® may also implement a process manager, such as, for example, Parallel Multithreaded Machine ("PM2"); a resource and performance monitoring tool, such as, for example, Node Application Metrics ("appmetrics"); a library module for building user interfaces, such as for example ReachJS®; and/or any other suitable and/or desired module.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, BLU-RAY, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

Referring now to FIGS. 2-5, the process flows and screenshots depicted are merely embodiments and are not intended to limit the scope of the disclosure. For example, the steps recited in any of the method or process descriptions may be executed in any order and are not limited to the order presented.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS' but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims.

Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method, comprising:
    executing, by at least one blockchain computing device in a blockchain network, a zero-knowledge proof (ZKP) smart contract in response to receiving a proof, a customer hash, a merchant hash, and a purchase amount from a merchant computing device during a payment process;
    executing, by the at least one blockchain computing device via the zero-knowledge proof (ZKP) smart contract, a validate function, wherein the validate function is executed by inputting a verification key, the proof, and the customer hash into the validate function, wherein the validate function is associated with a zero-knowledge proof algorithm, and an output of the validate function comprises a Boolean value;
    adjusting, by the at least one blockchain computing device via the ZKP smart contract, a customer account balance associated with the customer hash in response to the validate function passing based at least in part on the Boolean value, wherein the customer account balance is adjusted based at least in part on the purchase amount, and wherein the customer account balance is maintained on the blockchain network;
    adjusting, by the at least one blockchain computing device via the ZKP smart contract, a merchant account balance associated with the merchant hash, wherein the merchant account balance is adjusted based at least in part on the purchase amount, and wherein the merchant account balance is maintained on the blockchain network; and
    writing, by the at least one blockchain computing device via the ZKP smart contract, a success notification to the blockchain network in response to a consensus agreement among a plurality of blockchain computing devices in the blockchain network, wherein the success notification comprises data indicating that the payment process was successfully completed, and the at least one blockchain computing device being part of the plurality of computing devices.

2. The method of claim 1, wherein the proof is generated by a customer computing device based at least in part on a proof function associated with the zero-knowledge proof algorithm; and
    wherein the proof function is executed by inputting a proving key, the customer hash, and a payment hash into the proof algorithm.

3. The method of claim 2, wherein the proof is generated in response to a payment purchase being initiated with the merchant computing device; and wherein the payment hash is generated by inputting customer identifying data and a customer nonce into a hashing algorithm.

4. The method of claim 1,
wherein the zero-knowledge proof algorithm is created by an issuer computing device,
wherein the zero-knowledge proof algorithm comprises a key generator function, the proof, and the validate function;
wherein a proving key and the verification key are generated based at least in part on an execution of the key generator function;
wherein the key generator function is executed by inputting a random number into the key generator function; and
wherein the ZKP smart contract is generated to comprise the validate function.

5. The method of claim 1,
wherein the merchant hash is generated in response a merchant registration request associated with the merchant computing device; and
wherein the merchant hash is generated by inputting merchant identifying data and a merchant nonce into a hashing algorithm.

6. The method of claim 5, further comprising writing, by the at least one computing device via the ZKP smart contract, the merchant hash and the merchant account balance to the blockchain.

7. The method of claim 1,
wherein the customer hash is generated based at least in part on a customer registration request associated with a customer computing device; and
wherein the customer hash is generated by inputting customer identifying data and a customer nonce into a hashing algorithm.

8. The method of claim 7, further comprising writing, by the at least one computing device via the ZKP smart contract, the customer hash and the customer account balance to the blockchain network.

9. A computer-based system, comprising:
a processor; and
a tangible, non-transitory memory configured to communicate with the processor, the tangible, non-transitory memory having instructions stored thereon that, in response to execution by the processor, cause the processor to perform operations comprising:
executing a zero-knowledge proof (ZKP) smart contract in response to receiving a proof, a customer hash, a merchant hash, and a purchase amount from a merchant computing device during a payment process;
executing, by the ZKP smart contract, a validate function, wherein the validate function is configured to be executed by inputting a verification key, the proof, and the customer hash into the validate function, wherein the validate function is associated with a zero-knowledge proof algorithm, and an output of the validate function comprises a Boolean value;
adjusting, by the ZKP smart contract, a customer account balance associated with the customer hash in response to the validate function passing based at least in part on the Boolean value, wherein the customer account balance is adjusted based at least in part on the purchase amount, and wherein the customer account balance is maintained on a blockchain;
adjusting, by the ZKP smart contract, a merchant account balance associated with the merchant hash, wherein the merchant account balance is adjusted based at least in part on the purchase amount, and wherein the merchant account balance is maintained on the blockchain; and
writing, by the ZKP smart contract, a success notification to the blockchain in response to a consensus agreement among a plurality of blockchain computing devices in the blockchain, wherein the success notification comprises data indicating that the payment process was successfully completed.

10. The computer-based system of claim 9,
wherein the proof is generated by a customer computing device based at least in part on a proof function associated with the zero-knowledge proof algorithm; and
wherein the proof function is configured to be executed by inputting a proving key, the customer hash, and a payment hash into the proof algorithm.

11. The computer-based system of claim 10,
wherein the proof is generated by the customer computing device in response to a payment purchase being initiated with the merchant computing device; and
wherein the payment hash is generated by inputting customer identifying data and a customer nonce into a hashing algorithm.

12. The computer-based system of claim 9,
wherein the zero-knowledge proof algorithm is created by an issuer computing device;
wherein the zero-knowledge proof algorithm comprises a key generator function, the proof, and the validate function;
wherein a proving key and the verification key are generated in response to an execution of the key generator function;
wherein the key generator function is configured to be executed by inputting a random number into the key generator function; and
wherein the ZKP smart contract is generated to comprise the validate function.

13. The computer-based system of claim 9,
wherein the merchant hash is generated by an issuer computing device based at least in part on a merchant registration request associated with the merchant computing device; and
wherein the merchant hash is generated by inputting merchant identifying data and a merchant nonce into a hashing algorithm.

14. The computer-based system of claim 13, wherein the operations further comprise writing, by the ZKP smart contract, the merchant hash and the merchant account balance to the blockchain.

15. The computer-based system of claim 9,
wherein the customer hash is generated by an issuer computing device in response to an issuer computing device receiving a customer registration request from a customer computing device; and
wherein the customer hash is generated by inputting customer identifying data and a customer nonce into a hashing algorithm.

16. The computer-based system of claim 15, wherein the operations further comprise writing, by the ZKP smart contract, the customer hash and the customer account balance to the blockchain.

17. An article of manufacture including a non-transitory, tangible computer readable storage medium having instructions stored thereon that, in response to execution by a processor of at least one computing device of a blockchain network, cause the processor to perform operations comprising:

executing a zero-knowledge proof (ZKP) smart contract in response to receiving a proof, a customer hash, a merchant hash, and a purchase amount from a merchant computing device during a payment process, the merchant hash being generated via a cryptographic hash function during a registration of a merchant associated with the merchant computing device with a ZKP payments system;

executing, by the ZKP smart contract, a validate function, wherein the validate function is configured to be executed by inputting a verification key, the proof, and the customer hash into the validate function, wherein the validate function is associated with a zero-knowledge proof algorithm, and an output of the validate function comprises a Boolean value;

adjusting, by the ZKP smart contract, a customer account balance associated with the customer hash in response to the validate function passing based at least in part on the Boolean value, wherein the customer account balance is adjusted based at least in part on the purchase amount, and wherein the customer account balance is maintained on the blockchain network;

adjusting, by the ZKP smart contract, a merchant account balance associated with the merchant hash, wherein the merchant account balance is adjusted based at least in part on the purchase amount, and wherein the merchant account balance is maintained on the blockchain network; and writing, by the ZKP smart contract, a success notification to the blockchain network in response to a consensus agreement among a plurality of blockchain computing devices in the blockchain network, wherein the success notification comprises data indicating that the payment process was successfully completed.

18. The article of manufacture of claim 17,
wherein the proof is generated by a customer computing device based at least in part on an execution of a proof function associated with the zero-knowledge proof algorithm;

wherein the proof function is configured to be executed by inputting a proving key, the customer hash, and a payment hash into the proof algorithm;

wherein the proof is generated in response to an initiation of a payment purchase with the merchant computing device; and wherein the payment hash is generated by inputting customer identifying data and a customer nonce into a hashing algorithm.

19. The article of manufacture of claim 17, wherein the zero-knowledge proof algorithm is created by an issuer computing device;

wherein the zero-knowledge proof algorithm comprises a key generator function, the proof function, and the validate function;

wherein a proving key and the verification key are generated in response to an execution of the key generator function;

wherein the key generator function is configured to be executed by inputting a random number into the key generator function; and wherein the ZKP smart contract comprises the validate function.

20. The article of manufacture of claim 17,
wherein the merchant hash is generated based at least in part on an issuer computing device receiving a merchant registration request from the merchant computing device;

wherein the merchant hash is generated by inputting merchant identifying data and a merchant nonce into a hashing algorithm;

wherein the customer hash is generated in response to the issuer computing device receiving a customer registration request from a customer computing device; and wherein the customer hash is generated by inputting customer identifying data and a customer nonce into a hashing algorithm.

* * * * *